(12) United States Patent
Kwon

(10) Patent No.: US 10,732,385 B2
(45) Date of Patent: *Aug. 4, 2020

(54) SUPER WIDE ANGLE OPTICAL LENS SYSTEM

(71) Applicant: LG Innotek Co., Ltd., Seoul (KR)

(72) Inventor: Dukkeun Kwon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,254

(22) Filed: Feb. 2, 2018

(65) Prior Publication Data

US 2018/0157010 A1 Jun. 7, 2018

Related U.S. Application Data

(63) Continuation of application No. 14/949,239, filed on Nov. 23, 2015, now Pat. No. 9,915,806, which is a continuation of application No. 13/808,217, filed as application No. PCT/KR2011/004580 on Jun. 23, 2011, now Pat. No. 9,223,116.

(30) Foreign Application Priority Data

Jul. 15, 2010 (KR) .................. 10-2010-0068406

(51) Int. Cl.
*G02B 3/02* (2006.01)
*G02B 13/18* (2006.01)
*G02B 13/00* (2006.01)
*G02B 9/62* (2006.01)
*G02B 1/04* (2006.01)
*G02B 5/20* (2006.01)

(52) U.S. Cl.
CPC ......... *G02B 13/0045* (2013.01); *G02B 1/041* (2013.01); *G02B 5/208* (2013.01); *G02B 9/62* (2013.01); *G02B 13/006* (2013.01)

(58) Field of Classification Search
CPC .......... G02B 1/041; G02B 7/021; G02B 9/62; G02B 13/0045
USPC .................................. 359/642–830
See application file for complete search history.

(56) References Cited

U.S. PATENT DOCUMENTS 5,682,269 A * 10/1997 Kimura .................... G02B 9/60
359/752
7,933,078 B2  4/2011 Jung et al.
(Continued)

FOREIGN PATENT DOCUMENTS

CN  201345001 Y  11/2009
CN  201383030 Y  1/2010
(Continued)

OTHER PUBLICATIONS

U.S. Appl. No. 13/808,217, filed Jan. 3, 2013.
U.S. Appl. No. 14/949,239, filed Nov. 23, 2015.

*Primary Examiner* — Mahidere S Sahle
(74) *Attorney, Agent, or Firm* — Birch, Stewart, Kolasch & Birch, LLP

(57) ABSTRACT

An optical lens including, in order from an object side to an image side, a first lens having a negative refractive power, a second lens having a negative refractive power, a third lens, a fourth lens having a positive refractive power, a fifth lens having a negative refractive power, and a sixth lens having a positive refractive power, wherein the second lens has a concave object side surface.

18 Claims, 4 Drawing Sheets

(56) References Cited

U.S. PATENT DOCUMENTS

| | | |
|---|---|---|
| 2005/0219714 A1 | 10/2005 | Nakayama |
| 2006/0274433 A1 | 12/2006 | Kamo |
| 2007/0139793 A1 | 6/2007 | Kawada |
| 2009/0059395 A1* | 3/2009 | Lin .......................... G02B 9/62 |
| | | 359/761 |
| 2009/0251801 A1 | 10/2009 | Jung et al. |
| 2009/0296234 A1* | 12/2009 | Asami .................... G02B 13/04 |
| | | 359/713 |
| 2010/0142062 A1* | 6/2010 | Asami .................... G02B 13/04 |
| | | 359/793 |
| 2010/0195221 A1 | 8/2010 | Sato |
| 2013/0194488 A1 | 8/2013 | Kubota et al. |

FOREIGN PATENT DOCUMENTS

| | | | |
|---|---|---|---|
| EP | 1734393 A1 * | 12/2006 | .............. G02B 9/62 |
| JP | 2004-245893 A | 9/2004 | |
| JP | 2007-139985 A | 6/2007 | |
| JP | 2007-164079 A | 6/2007 | |
| JP | 2008-233610 A | 10/2008 | |
| JP | 2008-309901 A | 12/2008 | |

* cited by examiner

[Figure 1]
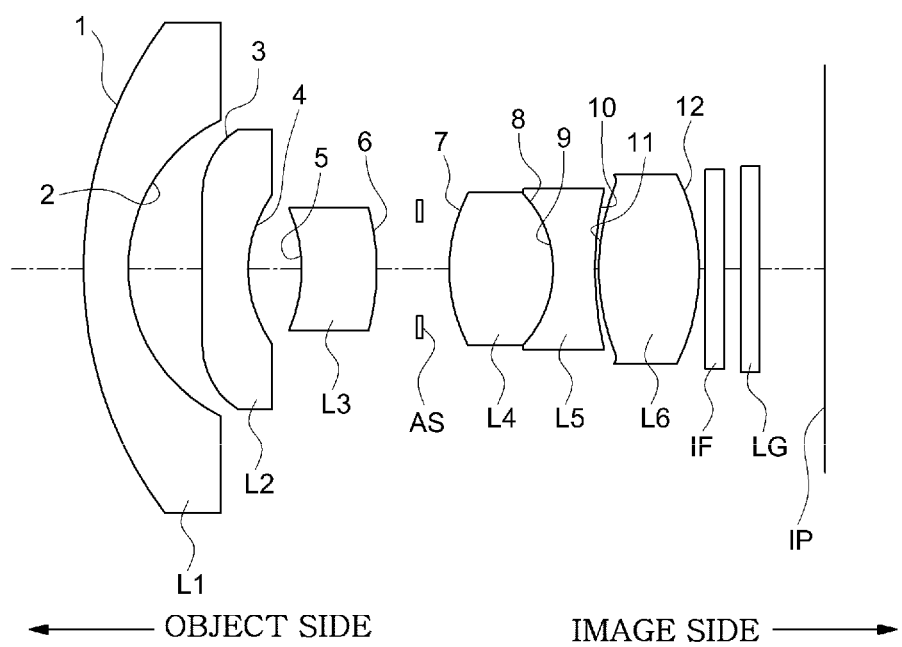

【Figure 2】

|  | R | D | N |
|---|---|---|---|
| 1 | 7.8458 | 0.8905 | 1.611 |
| 2* | 3.2210 | 1.4716 |  |
| 3* | -9.5681 | 0.8724 | 1.533 |
| 4 | 4.9183 | 1.0450 |  |
| 5 | -2.8971 | 1.4952 | 1.755 |
| 6 | -3.6810 | 0.9097 |  |
| Stop | Infinity | 0.4997 |  |
| 8 | 3.0903 | 2.0462 | 1.776 |
| 9 | -2.1003 | 0.8075 | 1.855 |
| 10 | 6.1818 | 0.0481 |  |
| 11* | 2.7831 | 2.0000 | 1.533 |
| 12* | -2.8415 | 1.0000 |  |
| 13 | Infinity | 0.4000 | 1.525 |
| 14 | Infinity | 0.2998 |  |
| 15 | Infinity | 0.4000 | 1.525 |
| 16 | Infinity | 0.1000 |  |
| 17 | Infinity | 1.1452 |  |
| IP | Infinity | 0.0107 |  |

* REPRESENTS ASPHERIC SURFACE

【Figure 3】

|  | k | A | B | C | D |
|---|---|---|---|---|---|
| 3* | 0.000000 | 0.311299E-01 | -.420445E-02 | 0.338004E-03 | 0.410497E-04 |
| 4* | -3.241349 | 0.466150E-01 | 0.164510E-02 | -.278191E-02 | 0.222625E-02 |
| 11* | 0.535570 | -.180234E-01 | -.791412E-02 | 0.366024E-02 | -.941069E-03 |
| 12* | 0.425858 | 0.253470E-01 | 0.162102E-02 | -.654585E-03 | 0.000000 |

【Figure 4】
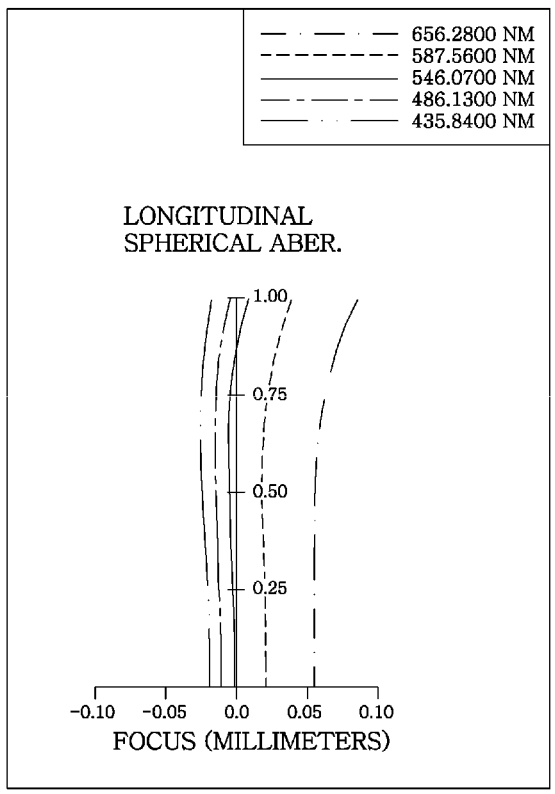
【Figure 5】
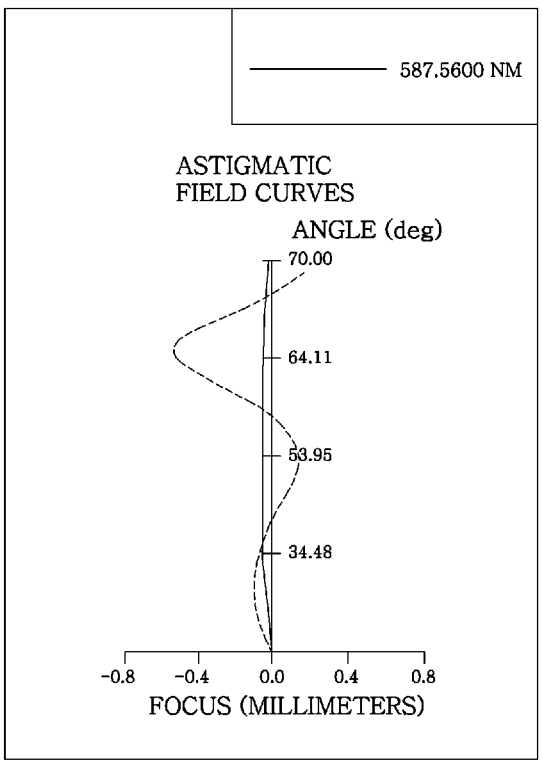

【Figure 6】
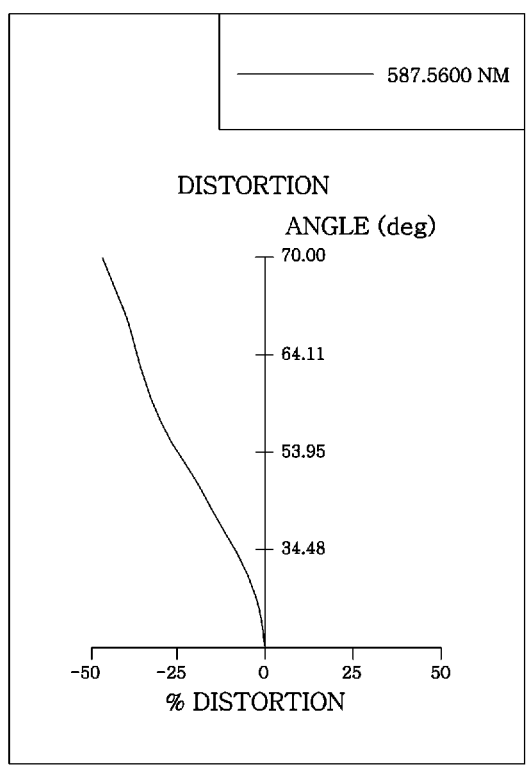

SUPER WIDE ANGLE OPTICAL LENS SYSTEM

CROSS-REFERENCE TO RELATED APPLICATIONS

This application is a Continuation of copending U.S. application Ser. No. 14/949,239 filed on Nov. 23, 2015, which is a Continuation of U.S. application Ser. No. 13/808,217 filed on Jan. 3, 2013 (now U.S. Pat. No. 9,223,116 issued on Dec. 29, 2015), which is the National Phase of International Application No. PCT/KR2011/004580 filed on Jun. 23, 2011 and claims priority under 35 U.S.C. § 119(a) to Korean Patent Application No. 10-2010-0068406 filed in the Republic of Korea on Jul. 15, 2010. The contents of all of these applications are hereby incorporated by reference as fully set forth herein in their entirety.

TECHNICAL FIELD

The teachings in accordance with the exemplary embodiments of this invention relate generally to a super wide angle optical lens system, and more particularly to a super wide angle optical lens system configured to realize a super wide angle by arranging a six-lens constitution on an optical axis.

BACKGROUND ART

Recently, various electronic equipment including a mobile communication terminal, a personal computer, a lap top computer, a PDA and a vehicle have a camera installed therein to display, store, transmit or photograph image data and to perform an on-line chatting.

With slimmer mobile communication terminals or smaller-sized computers or laptops, cameras are required to be reduced in size and weight and exhibit high image quality. The digital cameras installed and used for these electronic equipment need to be smaller and lighter so as not to obstruct the view of a users and harm aesthetic appearance.

In addition, such cameras with smaller size and lighter weight and high definition should have a wide angle of view to obtain as broad image data as possible. As a result, attempts to maintain a wide angle of view for broad image data, a high definition and stabilized optical properties by reducing focal distance while reducing the size of the camera have been actively made. However, these attempts have led to aggravation of distortion of the wide angle lens.

DISCLOSURE

Technical Problem

It is an object of the present invention to provide a super wide angle optical lens system reduced in size and weight and increased in definition for various electronic devices and vehicles while capable of obtaining satisfactory optical performance, an appropriate wide field angle and exhibiting high image quality and broad image data, thereby reducing distortion of an image.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a super wide angle optical lens system sequentially arranged with a plurality of lenses between an object and an image forming surface about an optical axis, comprising: a first lens having a negative refractive power; a second lens having a negative refractive power; a third lens having a negative refractive power; a fourth lens having a positive refractive power; a fifth lens having a negative refractive power; and a sixth lens having a negative refractive power, where each of the lenses may satisfy following conditional expression 1:

$$0.30 < Y/(f \times \tan \theta_d) < 0.60$$

where, $\theta_d$ represents maximum half field angle of an optical system, Y represents maximum image height (mm), and f represents focal length (mm) of the optical system.

Preferably, each of the lenses may satisfy following conditional expression 2:

$$3.0 < \theta_d/TL < 9.0$$

where, $\theta_d$ represents maximum half field angle of an optical system, and TL represents a distance from an object-side surface of a lens closest to the object side to an image forming surface.

Preferably, the fourth and fifth lenses form one lens group, the fourth and fifth lenses cemented together or spaced apart from each other at a predetermined distance.

Preferably, the super wide angle optical lens system further includes an aperture stop disposed between the third and fourth lenses to adjust light amount.

Preferably, a curvature radius of an object side surface of the first lens is larger than that of an upper side surface.

Preferably, a curvature radius of an upper side surface the third lens is larger than that of an object side surface.

Preferably, the second lens has at least one of both surfaces formed of an aspheric surface.

Preferably, the sixth lens has at least one of both surfaces formed of an aspheric surface.

Preferably, the super wide angle optical lens system further includes an IR (Infrared) filter between the sixth lens and the image forming surface.

Preferably, the super wide angle optical lens system further includes a cover glass between the sixth lens and the image forming surface.

Preferably, the first lens has a meniscus shape with a convex object side surface.

Preferably, the third lens has a meniscus shape with a convex upper side.

Preferably, the fourth lens has both surfaces in a convex shape.

Preferably, the fifth lens has both surfaces in a concave shape.

Preferably, the sixth lens has both surfaces in a convex shape.

Preferably, a curvature radius of an object side surface of the first lens is larger than that of an upper side surface.

Preferably, a curvature radius of an upper side surface the third lens is larger than that of an object side surface.

Preferably, the second and sixth lenses are plastic lenses.

Preferably, the fourth and fifth lenses form one lens group, the fourth and fifth lenses cemented together or spaced apart from each other at a predetermined distance.

Preferably, the super wide angle optical lens system further includes an aperture stop disposed between the third and fourth lenses to adjust light amount.

Advantageous Effects of Invention

The super wide angle optical lens system according to the present invention has an advantageous effect in that it is reduced in size and weight and increased in definition for various electronic devices and vehicles while capable of obtaining satisfactory optical performance, an appropriate wide field angle and exhibiting high image quality and broad image data, thereby reducing distortion of an image.

DESCRIPTION OF DRAWINGS

The teachings of the present invention can be readily understood by considering the following detailed description in conjunction with the accompanying drawings, and in the drawings, a thickness, a size, and a shape of a lens are little exaggerated for description. Particularly, a spherical shape or an aspherical shape shown in the drawings is just an example and the present invention is not limited thereto, in which:

FIG. 1 is a diagram illustrating a lens constitution according to an exemplary embodiment of the present invention FIG. 2 is a diagram illustrating lens data of each lens surface according to an exemplary embodiment of the present invention;

FIG. 3 is a diagram illustrating an aspheric coefficient of an aspheric surface according to an exemplary embodiment of the present invention;

FIG. 4 graphically illustrates a spherical aberration according to an exemplary embodiment of the present invention;

FIG. 5 graphically illustrates astigmatism according to an exemplary embodiment of the present invention; and FIG. 6 is a diagram illustrating distortion according to an exemplary embodiment of the present invention.

BEST MODE FOR CARRYING OUT THE INVENTION

The best mode for carrying out the present invention (which will be referred to as an exemplary embodiment hereinafter) will now be described with reference to the accompanying drawings.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and in addition, descriptions of well-known functions and constructions are omitted for clarity and conciseness.

Now, the present invention will be described in detail with reference to the accompanying drawings.

FIG. 1 is a diagram illustrating a lens constitution according to an exemplary embodiment of the present invention.

Referring to FIG. 1, a super wide angle optical lens system according to an exemplary embodiment of the present invention includes a six-lens constitution sequentially arranged between an object and an image forming surface about an optical axis, that is, a first lens (L1), a second lens (L2), a third lens (L3), a fourth lens (L4), a fifth lens (L5) and a sixth lens (L6). In addition, an IR (Infrared) filter and a cover glass (CG) may be further included between the sixth lens (L6) and an image forming surface (IP).

Light incident from an object sequentially refracts and passes the first lens (L1), the second lens (L2), the third lens (L3), the fourth lens (L4), the fifth lens (L5) and the sixth lens (L6), and is captured on the image forming surface disposed on an upper side.

The first lens (L1) has a negative refractive power and has a meniscus shape with a convex object-side surface (1), where a curvature radius of an object side surface of the first lens is larger than that of an upper side surface (2). The second lens (L2) has a negative refractive power and is at least one of both surfaces (3, 4) formed of aspheric surface. In the present exemplary embodiment, the second lens (L2) has both surfaces (3, 4) formed of aspheric surface, each of aspheric coefficients will be described later.

The third lens has a negative refractive power and has a meniscus shape with a convex upper-side surface, where a curvature radius of an upper side surface (4) of the third lens is larger than that of an object side surface (3).

The fourth lens has a positive refractive power with both surfaces (7, 8) in a convex shape. An aperture stop is disposed between the third and fourth lenses (L3, L4) to adjust light amount of an image formed on an image forming surface.

The fifth lens has a negative refractive power with both surfaces (9, 10) in a concave shape. The sixth lens has a positive refractive power with both surfaces (11, 12) in a convex shape, where the second and sixth lenses (L2, L6) are preferably formed with plastic material for manufacturing convenience, and each of the lenses (L1, L2, L3, L4, L5, L6) may satisfy following conditional expression 1:

$$0.30 < Y/(f \times \tan \theta_d) < 0.60 \quad \text{<CONDITIONAL EXPRESSION 1>}$$

where, $\theta_d$ represents maximum half field angle of an optical system, Y represents maximum image height (mm), and f represents focal length (mm) of the optical system.

The field angle defines an angle formed by a photographable scope relative to a lens center, a half field angle, which is half the field angle, defines an angle formed relative to a radical axis passing the lens center, and $\theta_d$ uses degree as unit.

Furthermore, the image height defines a height of an image formed on an upper surface, and its unit is mm. The focal length (f) also uses mm as unit. In the expressions for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used.

If the value is less than 0.30 in the above conditional expression 1, the length of the optical system is lengthened and it is difficult to obtain an optical performance in optical angle, if the value is more than 0.60, the distortion of the optical system becomes great to make the distortion of image deteriorated.

Preferably, each of the lenses (L1, L2, L3, L4, L5, L6) may satisfy following conditional expression 2:

$$3.0 < \theta_d/TL < 9.0 \quad \text{<CONDITIONAL EXPRESSION 2>}$$

where, $\theta_d$ represents maximum half field angle of an optical system, and TL represents a distance from an object-side surface of a lens closest to the object side to an image forming surface.

Particularly, values that satisfy the conditional expressions 1 and 2 in the present exemplary embodiment are where the focal length (f) is 1.53 mm, the maximum image height (Y) is 2.24 mm, the distance (TL) from an object-side surface of a lens closest to the object side to an image forming surface is 14.5 mm and the maximum half field angle ($\theta_d$) is 70 degrees.

Mode for the Invention

FIG. 2 is a diagram illustrating lens data of each lens surface according to an exemplary embodiment of the present invention, and FIG. 3 is a diagram illustrating an aspheric coefficient of an aspheric surface according to an exemplary embodiment of the present invention.

The lens data illustrated in FIG. 2 include data of each lens surface (1, 2, 3, 4, 5, 6, 7, 8, 9, 10, 11, 12), both surfaces (13, 14) of infrared filter (IF), both surfaces (15, 16) of cover glass (CG) and the image forming surface (IP).

R in FIG. 2 represents curvature radius of each surface, d represents thickness of lens or a distance between each lens or a distance between relevant lens and an image or an object, N represents refractive index of each lens, and * represents an aspheric lens.

The aspheric coefficient data illustrated in FIG. 3 are data relative to both surfaces (3, 4) of the second lens (L2), and both surfaces (11, 12) of the sixth lens (L6), and * represents the aspheric lens.

Preferably, the aspheric coefficients (A, B, C, D) may satisfy following conditional expression 3:

$$Z = \frac{cY^2}{1 + \sqrt{1-(1+K)c^2Y^2}} + \quad \text{<CONDITIONAL EXPRESSION 3>}$$

-continued
$$AY^4 + BY^6 + CY^8 + DY^{10} + EY^{12} + FY^{14} + \ldots$$

where, Z represents a distance from a lens vertex to an optical axis, Y represents a distance vertical to the optical axis, c is an inverse curvature radius at the lens vertex, k represents conic constant and A, B, C, D, E, F aspheric coefficients.

Aberrations according to the present exemplary embodiments may be illustrated by graphs, where FIG. 4 graphically illustrates a spherical aberration according to an exemplary embodiment of the present invention, FIG. 5 graphically illustrates astigmatism according to an exemplary embodiment of the present invention, and FIG. 6 is a diagram illustrating distortion according to an exemplary embodiment of the present invention.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

INDUSTRIAL APPLICABILITY

The present invention has an industrial applicability in that it is reduced in size and weight and increased in definition for various electronic devices and vehicles while capable of obtaining satisfactory optical performance, an appropriate wide field angle and exhibiting high image quality and broad image data, thereby reducing distortion of an image.

What is claimed is:

1. An optical lens comprising, in order from an object side to an image side:
   a first lens having a negative refractive power;
   a second lens having a negative refractive power;
   a third lens having a negative refractive power, the third lens having a concave object side surface, and a curvature radius of an object side surface of the third lens is less than that of an image side surface of the third lens;
   a fourth lens having a positive refractive power;
   a fifth lens having a negative refractive power; and
   a sixth lens having a positive refractive power,
   wherein the total number of optical lenses is six.

2. The optical lens of claim 1, wherein the first lens comprises a meniscus shape with a convex object side surface, and
   wherein the second lens comprises a concave object side surface and a concave image side surface, and the second lens and the third lens are spaced apart.

3. The optical lens of claim 1, wherein the third lens comprises a meniscus shape with a convex image side surface.

4. The optical lens of claim 1, wherein the fourth lens comprises a convex object side surface and a convex image side surface, wherein the fifth lens comprises a concave object side surface and a concave image side surface, and wherein the sixth lens comprises a convex object side surface and a convex image side surface.

5. The optical lens of claim 1, wherein an image side surface of the fourth lens has a curvature radius corresponding with that of an object side surface of the fifth lens.

6. The optical lens of claim 5, wherein the image side surface of the fourth lens is surface-contacted with the object side surface of the fifth lens.

7. The optical lens of claim 1, wherein a curvature radius of an object side surface of the first lens is larger than that of an image side surface of the first lens.

8. The optical lens of claim 1, wherein at least one of the six lenses satisfies the following conditional expression:

$$3.0 < \theta d/TL < 9.0$$

where, θd represents a maximum half field angle of an optical system, and TL represents a distance from an object-side surface of a lens closest to the object side to an image forming surface.

9. The optical lens of claim 1, wherein at least one of the lenses satisfies the following conditional expression:

$$0.30 < Y/(f \times \tan \theta d) < 0.60$$

where, θd represents a maximum half field angle of an optical system, Y represents a maximum image height (mm), and f represents focal length (mm) of the optical system.

10. The optical lens of claim 1, further comprising an aperture stop disposed between the third lens and the fourth lens to adjust light amount.

11. The optical lens of claim 1, further comprising an IR (Infrared) filter between the sixth lens and an image forming surface.

12. The optical lens of claim 1, further comprising a cover glass between the sixth lens and an image forming surface.

13. The optical lens of claim 1, wherein the second and sixth lenses are plastic lenses.

14. The optical lens of claim 1, wherein the second lens comprises at least one of both surfaces formed of an aspheric surface, and wherein the sixth lens comprises at least one of both surfaces formed of an aspheric surface.

15. The optical lens of claim 1, wherein the sixth lens is a single lens, and wherein the fifth lens is a single lens.

16. The optical lens of claim 1, wherein a distance between an object side surface of the second lens and an image side surface of the first lens is greater than a distance between an image side surface of the second lens and an object side surface of the third lens.

17. A camera, the camera comprising the optical lens of claim 1.

18. An optical lens comprising, in order from an object side to an image side:

a first lens having a negative refractive power;

a second lens having a negative refractive power;

a third lens having a negative refractive power, the third lens having a concave object side surface, and a curvature radius of an object side surface of the third lens is less than that of an image side surface of the third lens;

a fourth lens having a positive refractive power;

a fifth lens having a negative refractive power; and a sixth lens having a positive refractive power, wherein the total number of optical lenses is six, wherein a curvature radius of an object side surface of the third lens (R5) is negative, wherein a curvature radius of an image side surface of the third lens (R6) is negative, and wherein R6/R5>1.

* * * * *